United States Patent [19]
Sugimura

[11] 3,971,563
[45] July 27, 1976

[54] SHAFT SEALING APPARATUS USING A FLUID SEALING SYSTEM

[75] Inventor: Shojiro Sugimura, Okayama, Japan

[73] Assignee: Mitsui Shipbuilding and Engineering Co., Ltd., Tokyo, Japan

[22] Filed: Apr. 3, 1975

[21] Appl. No.: 564,852

Related U.S. Application Data

[63] Continuation of Ser. No. 397,654, Sept. 17, 1973, abandoned.

[52] U.S. Cl. ................................. 277/27; 277/59; 277/62; 277/54; 277/73; 277/74
[51] Int. Cl.² ................. F16J 15/16; F16J 15/40
[58] Field of Search .............. 277/59, 62, 54, 65, 277/74, 53, 3, 27, 73

[56] References Cited
UNITED STATES PATENTS

| | | |
|---|---|---|
| 838,744 | 12/1906 | Parsons et al. .................... 277/54 X |
| 1,846,598 | 2/1932 | Hodgkinson ...................... 277/53 X |
| 3,085,808 | 4/1963 | Williams ........................... 277/73 X |
| 3,119,623 | 1/1964 | Shevchenko ..................... 277/27 X |
| 3,268,232 | 8/1966 | Richards .......................... 277/27 |
| 3,333,856 | 8/1967 | Voitik .............................. 277/59 |

*Primary Examiner*—Samuel B. Rothberg
*Attorney, Agent, or Firm*—Spensley, Horn & Lubitz

[57] ABSTRACT

A shaft sealing apparatus has a housing having axial symmetry about the axis of a shaft disposed therethrough. A seal ring supporting member is slidably disposed about the shaft and is enclosed by the housing. Seal rings are disposed in the seal ring supporting member. A means for moving the seal ring supporting member along the axial direction is provided so that the amount of overlapping area between the seal rings and a sealing portion of the shaft may be controllably varied.

6 Claims, 10 Drawing Figures

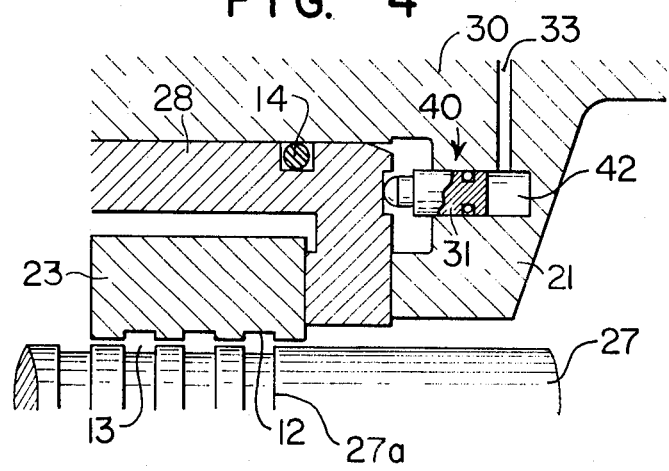
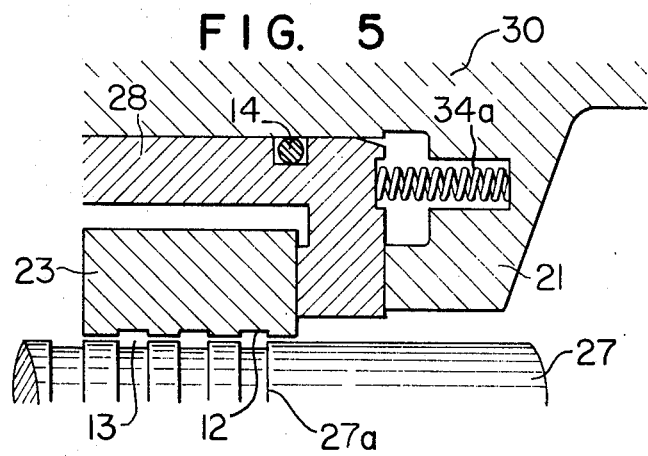

SHAFT SEALING APPARATUS USING A FLUID SEALING SYSTEM

This application is a continuation of application Ser. No. 397,654 filed Sept. 17, 1973, now abandoned.

BACKGROUND OF THE INVENTION

1. Field of the Invention

This invention relates to a shaft sealing apparatus using a sealing fluid.

2. Prior Art

Typically, a rotating shaft will require support by a bearing surface across which a differential gas pressure is maintained. Leakage across the bearing surface can be avoided in part by using a sealing fluid. According to the prior art, the pressure on the sealing fluid is typically maintained slightly higher than that of a high-pressure gas chamber. The pressure is maintained on a sealing fluid supply chamber so that it prevents the high-pressure gas from leaking into the low-pressure gas chamber across the bearing. Although a certain amount of the sealing fluid supplied into the sealing fluid supply chamber is forced into the high-pressure gas chamber, the greater part of the sealing fluid flows into the low-pressure chamber through a narrow path or clearance between the seal rings and the rotating shaft. This sealing fluid has the function of dissipating the frictional heat caused by the friction of the rotating shaft and the seal ring. On the other hand, some slight part of the sealing fluid flows into the high-pressure side. It generally is necessary to prevent its contact with the gas. In such a case, a substantial amount of the fluid has to be removed at great cost. Accordingly, the pressure of the sealing fluid supply chamber must be necessarily maintained only slightly higher than that of the high-pressure chamber.

However, the disadvantages in shaft sealing apparatus of the prior art which are mentioned above are due to the fact that the pressure in the sealing fluid supply chamber is varied in accordance with changes of pressure in the high-pressure gas chamber. Since the pressure of the sealing fluid supply chamber follows the pressure of the high-pressure gas chamber, the pressure disparity between the pressure of the high-pressure gas chamber and of the sealing fluid chamber is kept constant. Therefore, the amount of the sealing fluid which flows into the low-pressure chamber through the seal rings in the low-pressure side naturally varies. Thus, the cooling effect of the sealing fluid in regard to the frictional heat caused on the slidable contact surface between the low-pressure seal rings and the rotating shaft varies. Accordingly, when the gas pressure of the high-pressure gas chamber becomes extremely low, the pressure of the sealing fluid supply chamber is lowered, and it may happen that the amount of the sealing fluid necessary for cooling the contact surface between the seal rings and the rotating shaft cannot be satisfactorily supplied thereby resulting in excessive heat on the contact surface. Thus, the operation of the bearing must be disturbed by overheating or burning.

BRIEF SUMMARY OF THE INVENTION

The broad object of this invention is to provide a shaft sealing apparatus using a sealing fluid which eliminates the disadvantages of the prior art.

In general accordance with this invention, a shaft sealing apparatus using a sealing fluid provides constant cooling by supplying sufficient sealing fluid, even when the operating gas pressure on the sealing fluid, which in turn corresponds to the pressure of the high-pressure gas chamber, varies substantially or drops to an extremely low pressure

BRIEF DESCRIPTION OF THE DRAWINGS

FIGS. 3 to 5 are partially enlarged cross-sectional views showing an embodiment of the means to move the seal ring supporting member in the apparatus of this invention.

DETAILED DESCRIPTION OF THE INVENTION

Figure 1:
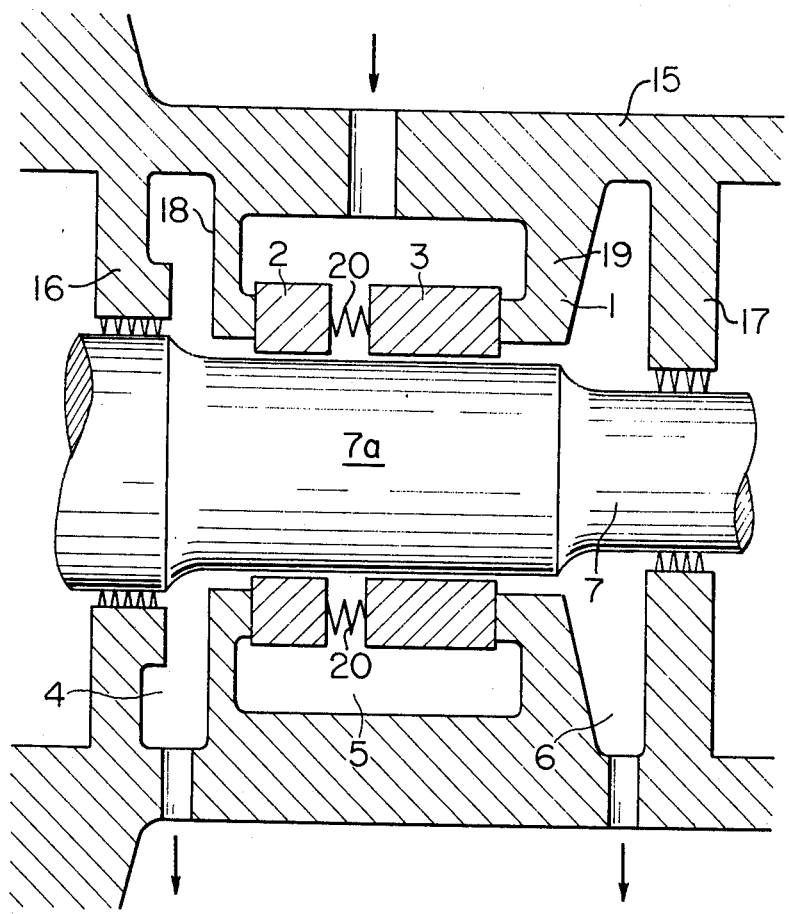
FIG. 1 is a cross-sectional view showing a conventional shaft sealing apparatus using a fluid sealing system.

According to the analysis of the viscous flow where: $\eta$ stands for the viscousity of the seal fluid; $l$ stands for the total length of the length of the slide phase between the seal ring 23 in the low-pressure side and the rotating shaft 27 in the direction of the shaft; $P$ stands for the pressure disparity between the pressure on the sealing fluid and the inner pressure of the low-pressure gas chamber; $N$ stands for the thermal calories caused on the contact surface; $Q$ stands for the quantity of the sealing fluid that leaks into the low-pressure gas chamber 26 from the sealing fluid supply chamber 25 through the path between the seal ring 23 at the low-pressure side and the rotating shaft 27; $\Delta t$ stands for the thermal increase of the sealing fluid; those elements present the following relationships:

$$N \propto l\eta \qquad (1)$$

$$Q \propto (P/l\eta) \qquad (2)$$

$$\Delta t \propto \frac{N}{Q} \propto \frac{(l\eta)^2}{P} \qquad (3)$$

As is apparent from Equation (3), $\Delta t$ may increase when the gas pressure decreases or as $P$ becomes smaller.

According to this invention, however, $\Delta t$ may be kept constant by decreasing $l^2$ to the same extent as $P$ decreases.

Figure 2:
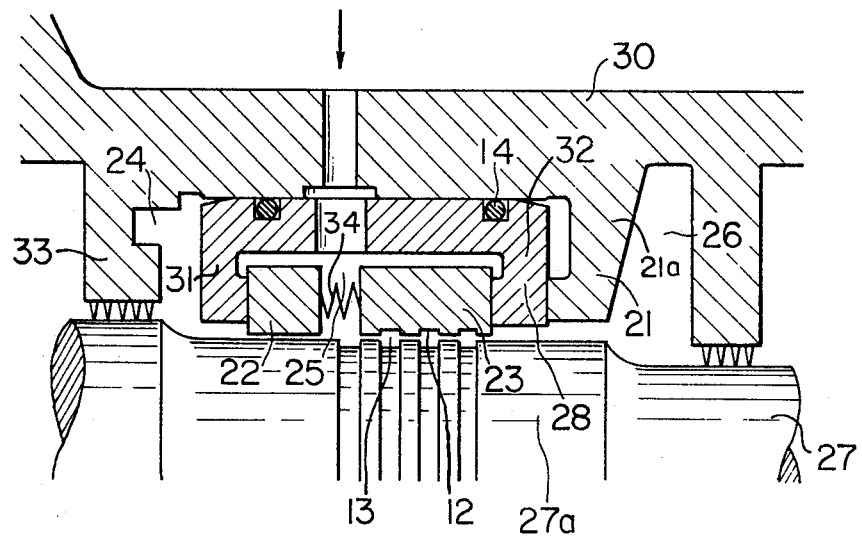
FIG. 2 is a longitudinal cross-sectional view showing a shaft sealing apparatus using a fluid sealing system of this invention.

FIG. 2 illustrates an embodiment of the shaft sealing apparatus using a sealing fluid of this invention. This apparatus provides smooth and stable operation with the operation pressure being in the range from approximately atmospheric pressure to that of the high-pressure gas chamber. In particular, the operation of a gas compressor under atmospheric pressure, which has been regarded as impossible, may become possible under the same operating condition as the usual operation pressure. Accordingly, it becomes unnecessary to change the operating condition in response to pressure differentials.

Figure 3:
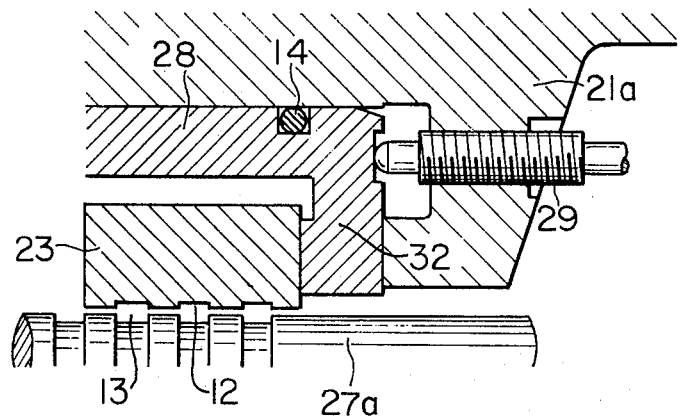

Before the shaft sealing apparatus according to the present invention is explained in reference to FIG. 3, a prior art system illustrated in FIG. 1 is explained for clarification of the functional difference between the present invention and the prior art.

In FIG. 1 showing a shaft sealing apparatus constructed according to the prior art, a rotary shaft 7 of a machine extends through a seal housing 15 having inner and outer wall portions 16 and 17. In housing 15, a seal casing 1 is provided between inner and outer wall portions 16 and 17 so as to surround a sealing portion 7a of rotary shaft 7. Seal rings 2 and 3 are disposed between end walls 18 and 19 of the casing 1. Springs 20 are disposed at several points between the rings 2 and 3 to urge them into contact with end walls 18 and 19 respectively. In seal casing 1, a sealing fluid supply chamber 5 is formed by the end walls 18 and 19 and the seal rings 2 and 3. The seal rings 2 and 3 are in rotationally sliding contact with the peripheral surface of sealing portion 7a of rotary shaft 7. A high pressure gas chamber 4 is formed between inner wall portion 16 of housing 15 and end wall 18 of casing 1, and a low pressure gas chamber 6 is formed between end wall 19 of the casing 1 and outer wall portion 17 of housing 1.

In the prior art as illustrated in FIG. 1 and as described hereinbefore, the sealing fluid, on which a pressure is maintained slightly higher than that in the high-pressure gas chamber 4, is fed into sealing fluid supply chamber 5 to prevent the leakage of high-pressure gas into the low-pressure gas chamber 6 from chamber 4. A certain amount of the fluid in the chamber 5 is forwarded into the chamber 4. However, the greater part of the fluid flows into the low-pressure chamber 4 through the clearance between the seal ring 3 at the low-pressure side and the shaft 7a. In this type of shaft sealing apparatus, as mentioned hereinbefore, some part of the fluid may flow into the high-pressure side. Generally, contact between the fluid and the gas must be prevented. In order to prevent contact, a substantial amount of the fluid must be drained from the system. This is very costly and wasteful.

In this prior art, as described hereinbefore, when the pressure in the sealing fluid supply chamber is reduced, a necessary and sufficient amount of the fluid does not flow toward the low-pressure gas chamber 6 through the clearance between the inner surface of seal ring 3 and seal portion 7a of shaft 7. Therefore, dissipation of the heat generated by the rotational friction between the seal ring 3 and seal portion 7a is prevented.

In comparison with conventional shaft sealing apparatus, the apparatus of this invention (shown in FIG. 2) is provided with an additional seal ring support member 28 which holds the seal ring 23 at the low-pressure side. One or more grooves on the contact surface of the seal ring 23 at the low-pressure side are in sliding contact with the rotating shaft 27a in order that the seal ring support 28 may be moved parallel to the direction of the shaft in order to change the length of the contact surface.

Seal ring supporting member 28 is provided in a seal housing 30 corresponding to seal housing 15 of the prior art shown in FIG. 1. Seal ring supporting member 28 surrounds a rotary shaft 27 and can be moved in the axial direction of shaft 27 while in slidable contact with the inner peripheral surface of housing 30 as shown in FIG. 2. Between the inner peripheral surface of the housing 30 and the outer peripheral surface of seal ring supporting member 28, seal rings 14 are disposed to prevent the leakage of sealing fluid supplied through the wall of the housing 30. Seal ring supporting member 28 is provided with end walls 31 and 32 projecting in an annular shape or in a form of an inner flange, as illustrated in FIGS. 2 and 3. In the embodiment shown in FIGS. 2 and 3, a seal casing 21, corresponding to the seal casing 1 in the prior art shown in FIG. 1, is formed with a wall portion 33 of the housing 30 and a wall 21a corresponding to the wall portion 19 in FIG. 1.

A pair of seal rings 22 and 23 is disposed between opposite end walls 31 and 32 of the seal ring supporting member 28. These seal rings 22 and 23 are urged into contact with the walls 31 and 32 respectively by springs 34, similarly, as the case shown in FIG. 1 and the inner peripheral surfaces of the rings 22 and 23 are in slidable contact with the outer peripheral surface of a sealing portion 27a of the shaft 27. In seal ring supporting member 28, a sealing fluid supply chamber 25 is formed by the outer peripheral portion, end walls 31 and 32 and the seal rings 22 and 23.

According to the present invention, a plurality of peripheral grooves 12 is formed on the inner peripheral surface of the seal ring 23 disposed at the lower pressure side. Side rings 22 and 23 can be slided by the sliding action of seal ring supporting member 28 in the axial direction. Means for sliding ring supporting member 28 are illustrated in FIGS. 3 to 5.

In FIG. 3, a screw rod 29 is screwed to wall portion 21a of housing 30. The inner end of screw rod 29 contacts the outside wall surface of end wall 32 of member 28. The sealing fluid in chamber 25 has a pressure higher than that in lower pressure chamber 26 and therefore forces member 28 against rod 29. When screw rod 29 is rotated by a suitable device (not shown) in the advancing direction, member 28 is moved to the left in FIG. 3. When the screw rod 29 is rotated in the retracting direction, the member 28 is returned toward the wall portion by the differential pressure between the pressure in seal chamber 25 and the pressure in low pressure chamber 26. The screw rod is operated in accordance with the operating requirements of the machine, for example, the intake and output pressures of a gas compressor.

The effects of the movable seal ring are as described below. Seal ring supporting member 28 is moved in the axial direction in relation to rotary shaft 27. According to the analysis of viscous flow of a fluid, $$N \propto l_n \tag{1}$$

$$Q \propto (P/l_n) \tag{2}$$

$$\Delta t \propto \frac{N}{Q} \propto \frac{(l_n)^2}{P} \tag{3}$$

where: $n$ is viscousity of the seal fluid; $l$ is the total axial length of the contact surface of seal ring 23 with seal portion 27a of the rotary shaft 27; $P$ is the differential pressure between the pressure of the sealing fluid in sealing fluid chamber 25 and the pressure of the gas in the low gas pressure chamber 26; $N$ is the heat measured in calories generated between the contact surfaces of seal ring 23 and between seal portion 27a of the rotary shaft 27; $Q$ is the quantity of the leaked fluid from seal fluid chamber 25 to low gas pressure chamber 26 through the clearance between the seal ring 23 and the sealing portion 27a; $t$ is the change in temperature of the fluid flowing between seal ring 23 and sealing portion 27a.

Figure 6:
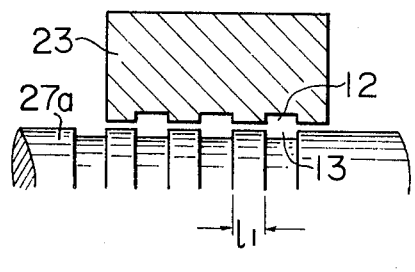
FIGS. 6 to 10 are partial views to illustrate the operation of the shaft sealing apparatus using a sealing fluid according to this invention.
Figure 7:
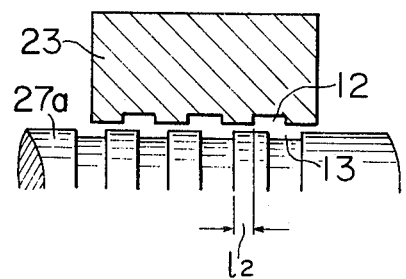
Figure 10:
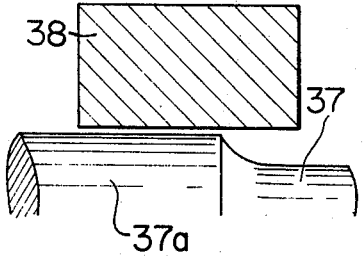

For the purpose of the shortening of the contact surface from $l_1$ to $l_2$, the apparatus may be constructed so that one or more grooves 13 are provided on the seal portion 27a of the rotary shaft 27, or the thick differential shown in FIG. 10 may be utilized for this purpose. One or more grooves 12 are provided on the inner peripheral surface of seal ring 23, which correspond to the grooves 13 on seal portion 27a of shaft 27 and are substantially identical with grooves 13 in their form and size. In this regard, it should be noted that the construction having a plurality of annular grooves around the shaft and the seal ring as shown in FIGS. 6 and 7 is more practical, because it is possible to decrease the displacement of seal ring 23 in the axial direction to obtain the necessary reduction of the length, $l$, as explained above.

In connection with the mechanism to move the seal ring 3 at the low-pressure side along the shaft, embodiments are proposed hereinbelow.

FIG. 4 illustrates another embodiment wherein the oil pressure cylinder 40 is employed instead of the screw shown in FIG. 3. In FIG. 4, except for oil pressure cylinder means 40, the structure is same as that shown in FIG. 3. A cylinder bore 42 is formed in wall portion 21 of housing 30 and a plunger 31 is disposed in cylinder bore 42 in a reciprocally slidable manner. The inner end of plunger 31 is urged into contact with the wall surface of end wall 32 of supporting member 28. Oil under pressure is supplied to plunger 31 from a suitable source disposed outside the machine through a passage 33 formed in housing 30. When the pressure in high pressure chamber 24 is reduced, the oil pressure supplied to passage 33 to drive the plunger 31 towards supporting member 28 is accordingly reduced. In FIG. 4, supporting member 28 is moved to the left in the axial direction by the movement of the plunger 31. As the result of the movement, the length of the overlapped portion of seal ring 23 with seal portion 27a of rotary shaft 27 is reduced from $l_1$ to $l_2$ as shown in FIGS. 6 and 7. Therefore, overheating is prevented. When the pressure in sealing fluid supply chamber 25 is increased, the oil pressure to cylinder bore 42 is decreased, and supporting member 28 returns to the right position by virtue of the differential pressure between the pressures in high pressure chamber 24 and low pressure chamber 26.

FIG. 5 shows still another embodiment wherein a spring 34 is employed instead of the screw 29 shown in FIG. 3. In this case, spring 34 is preferably designed so that when the operating requirements change and the pressure which encourages the seal ring support 28 toward low-pressure gas chamber 26 decreases, spring 34 tends to gradually move seal ring support 28 toward high-pressure gas chamber 24. Thus, the contact surface of seal ring 23 at the low-pressure side and the rotating shaft 27a is lessened and the generation of heat is controlled so that oil consumption is controlled by virtue of the decrease of the pressure. Accordingly, it becomes possible to keep the heat increase at a suitable level throughout the operation. On the other hand, when the gas pressure increases, the force, which thrusts the seal ring support 28 toward low-pressure gas chamber 26, will overwhelm the force of spring 34 so that the seal ring support 28 returns to its former position and the contact surface becomes greater in order to avoid the excessive leakage of the seal fluid. Accordingly it is possible to automatically operate the movement of the seal ring 23 toward the low-pressure side by utilizing the spring 34 according to FIG. 5.

Figure 8:
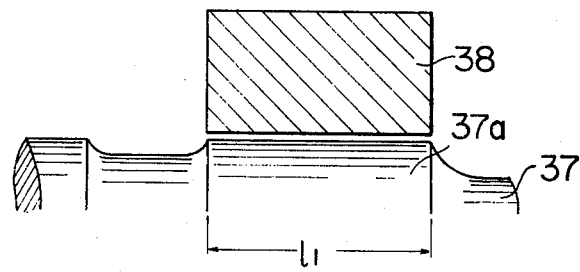
Figure 9:
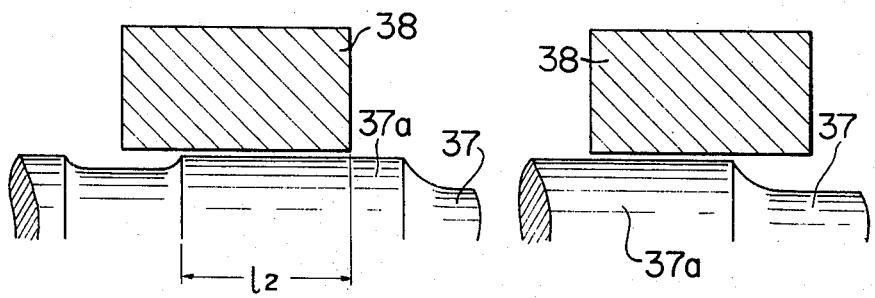

In FIGS. 8 to 10, a simplified embodiment of the present invention is illustrated. In this embodiment, a seal ring 38, disposed at the low pressure side, has no grooves such as those shown in FIGS. 6 and 7. Seal ring 38 is combined with seal ring 22 disposed at the high pressure side in FIG. 2 and is arranged in supporting member 28 together with seal ring 22 in the same manner as that shown in the embodiment in FIG. 2. Also in the embodiment shown in FIGS. 8 to 10, any means selected among a hydraulic means (FIG. 4), a screw means lap portions between a sealing portion 37a of shaft 37 and seal ring 38 is varied from $l_1$ to $l_2$ by actuating supporting member 28. Overheating is prevented in the same way as in the other embodiment.

I claim:

1. A shaft sealing apparatus using a sealing fluid comprising:
    a housing having first inner and first outer walls, said first inner and outer walls having a substantially axial symmetry and being internal to said housing;
    a rotary shaft extending through said inner and outer walls of said housing, said rotary shaft being disposed along the axis of symmetry of said inner and outer walls;
    a sealing portion formed on said rotary shaft;
    a seal ring supporting member having a high and a low pressure side, and having second inner and outer walls disposed around said sealing portion on said rotary shaft, said seal ring supporting member disposed within said first inner and outer walls of said housing and being slideable in an axial direction along said rotary shaft, said seal ring supporting member having a sealing fluid supply chamber being supplied with a sealing fluid;
    a first seal ring disposed in slideable contact with an outer peripheral surface of said sealing portion of said rotary shaft adjacent to said low pressure side of said seal ring supporting member;
    a second seal ring disposed in slidable contact with the outer peripheral surface of said sealing portion of said rotary shaft adjacent to said low pressure side of said seal ring supporting member, said second seal ring and sealing portion of said rotary shaft forming a labyrinthine chamber;
    a spring means arranged between said first and second seal rings for urging said seal rings into contact with said second inner walls of said seal ring supporting member; and
    a means for displacing said seal ring supporting member in an axial direction to vary the amount of said slidable contact of said seal rings with said sealing portion of said rotary shaft.

2. The shaft sealing apparatus of claim 1, wherein:
    said sealing portion has an axial length substantially equal to the axial length of said second seal ring and said rotary shaft has a region having a diameter smaller than the diameter of said sealing portion.

3. The shaft sealing apparatus of claim 1, wherein:
    said sealing portion has an axial length substantially equal to the axial length of said second seal ring and has a first plurality of grooves defined therein; and
    said second seal ring has a corresponding second plurality of grooves defined therein, whereby said first and second pluralities of grooves may be displaced to each other to vary said slideable contact between said second seal ring and said sealing portion of said rotary shaft.

4. The shaft sealing apparatus of claim 1, wherein said means for displacing said ring supporting member in the axial direction comprises a screw adjustably threaded through said housing, one end of said screw urging said ring supporting member whereby said member and sealing rings are displaced with respect to said rotary shaft.

5. The shaft sealing apparatus of claim 1, wherein said means for displacing said ring supporting member in the axial direction comprises a hydraulic cylinder disposed in said housing.

6. The shaft sealing apparatus of claim 1, wherein said means for displacing said ring supporting member in the axial direction comprises a spring disposed between said ring supporting member and said housing.

* * * * *